United States Patent
Lozhkin

(10) Patent No.: US 10,523,332 B1
(45) Date of Patent: Dec. 31, 2019

(54) OPTICAL TRANSMITTER AND METHOD FOR TRANSMITTING OPTICAL SIGNAL

(71) Applicant: FUJITSU LIMITED, Kawasaki-shi, Kanagawa (JP)

(72) Inventor: Alexander Nikolaevich Lozhkin, Kawasaki (JP)

(73) Assignee: FUJITSU LIMITED, Kanagawa (JP)

( * ) Notice: Subject to any disclaimer, the term of this patent is extended or adjusted under 35 U.S.C. 154(b) by 0 days.

(21) Appl. No.: 16/389,642

(22) Filed: Apr. 19, 2019

Related U.S. Application Data

(62) Division of application No. 15/395,501, filed on Dec. 30, 2016.

(30) Foreign Application Priority Data

Mar. 17, 2016 (JP) .................................. 2016-053293

(51) Int. Cl.
| | | |
|---|---|---|
| *H04B 10/2507* | (2013.01) | |
| *H04B 10/564* | (2013.01) | |
| *H04B 10/2575* | (2013.01) | |
| *H04B 10/54* | (2013.01) | |

(52) U.S. Cl.
CPC ..... *H04B 10/564* (2013.01); *H04B 10/25758* (2013.01); *H04B 10/541* (2013.01)

(58) Field of Classification Search
CPC ......................... H04B 10/541; H04B 10/25758
USPC .......... 398/186, 197; 375/285, 295, 296, 297
See application file for complete search history.

(56) References Cited

U.S. PATENT DOCUMENTS

| | | | |
|---|---|---|---|
| 5,055,770 | A | 10/1991 | Takahashi et al. |
| 5,128,950 | A | 7/1992 | Tsuchiya et al. |
| 5,179,565 | A | 1/1993 | Tsuchiya et al. |
| 6,819,877 | B1 | 11/2004 | Carter et al. |
| 2005/0002469 | A1 | 1/2005 | Oberg et al. |
| 2008/0057881 | A1 | 3/2008 | Dwyer |

(Continued)

FOREIGN PATENT DOCUMENTS

| | | |
|---|---|---|
| JP | H03-156379 A | 7/1991 |
| JP | H07-058698 A | 3/1995 |
| JP | 2001-053688 A | 2/2001 |

(Continued)

OTHER PUBLICATIONS

Cox III, C. H., et al., "Limits on the performance of RF-Over-Fiber Links and Their Impact on Device Design", IEEE Transactions on Microwave Theory and Techniques, vol. 54, No. 2, pp. 906-920, Feb. 2006.

(Continued)

*Primary Examiner* — Tesfaldet Bocure
(74) *Attorney, Agent, or Firm* — Arent Fox LLP

(57) ABSTRACT

An optical transmitter includes: an amplitude control circuit, an E/O (Electrical-to-Optical) circuit, a detector and an optical power control circuit. The amplitude control circuit controls an amplitude of an input electric signal to generate a constant amplitude electric signal. The E/O circuit generates a modulated optical signal from the constant amplitude electric signal by a direct modulation. The detector detects an amplitude modulation component of the input electric signal. The optical power control circuit controls a power of the modulated optical signal based on the amplitude modulation component detected by the detector.

1 Claim, 12 Drawing Sheets

(56) References Cited

U.S. PATENT DOCUMENTS

2012/0039603 A1\* 2/2012 Wiegner .......... H04B 10/25758
398/43
2016/0218801 A1 7/2016 Chung

FOREIGN PATENT DOCUMENTS

| JP | 2002-503055 A | 1/2002 |
| JP | 2003-224522 A | 8/2003 |
| WO | WO 99/40696 A1 | 8/1999 |

OTHER PUBLICATIONS

Han, C., et al., "Experimental Comparison of the Multi-IF Carrier Generation Methods in IF-over-Fiber System Using LTE Signals", 2014 International Tropical Meeting on Microwave Photonics (MWP) and the 2014 $9^{th}$ Asia-Pacific Microwave Photonics Conference (APMP), Sapporo, Japan.
Vasic, M., et al., "High Efficiency Power Amplifier Based on Envelope Elimination and Restoration Technique", IEEE 2010.
Quayle Office Action issued in related U.S. Appl. No. 15/395,501 dated Nov. 28, 2018.
Notice of Allowance issued in related U.S. Appl. No. 15/395,501 dated Feb. 26, 2019.
Office Action issued in related U.S. Appl. No. 15/395,501 dated Apr. 4, 2018.
Japanese Office Action issued in related Japanese Patent Application Serial No. 2016-053293 dated Sep. 10, 2019.

\* cited by examiner

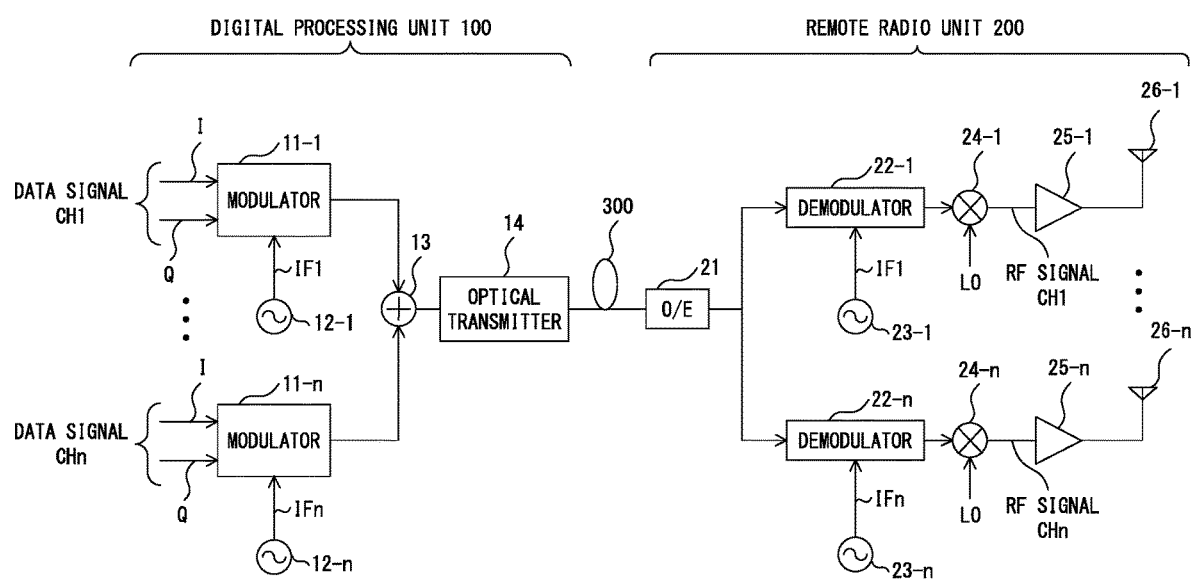
F I G. 2

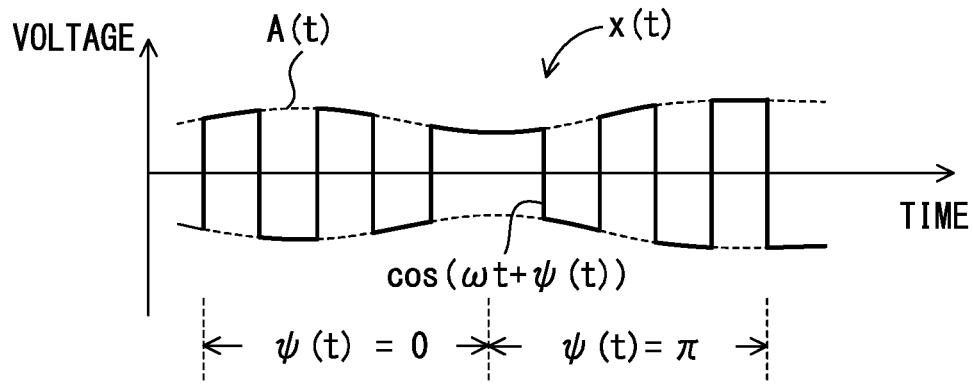
F I G. 7 A
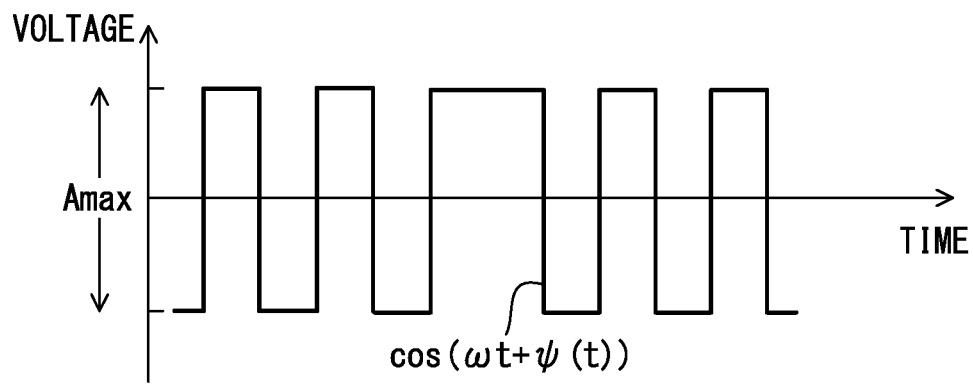
F I G. 7 B
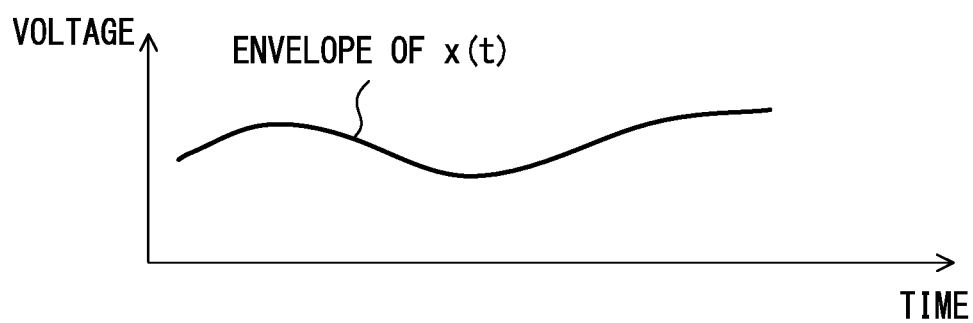
F I G. 7 C

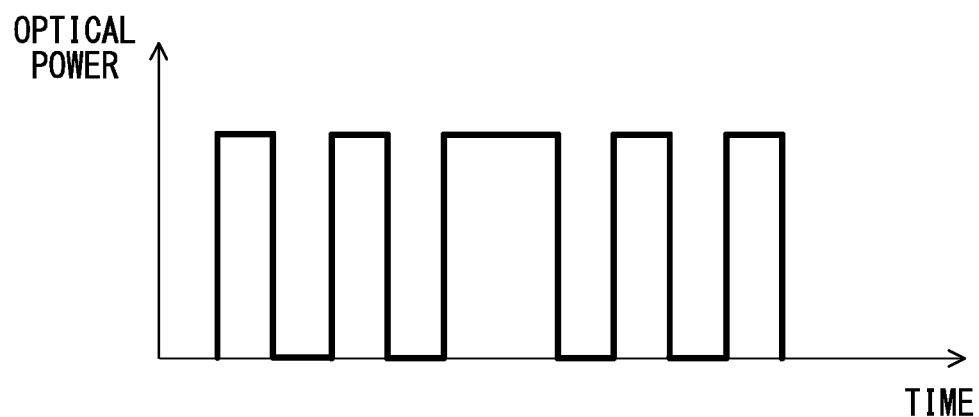
F I G. 8 A
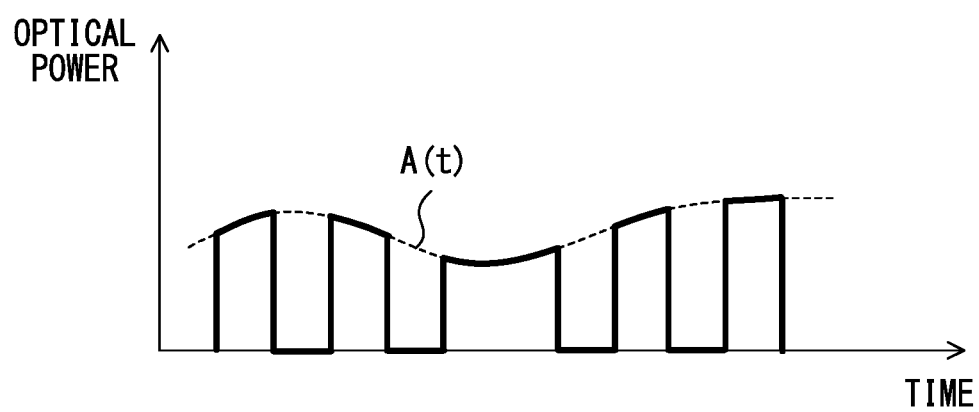
F I G. 8 B

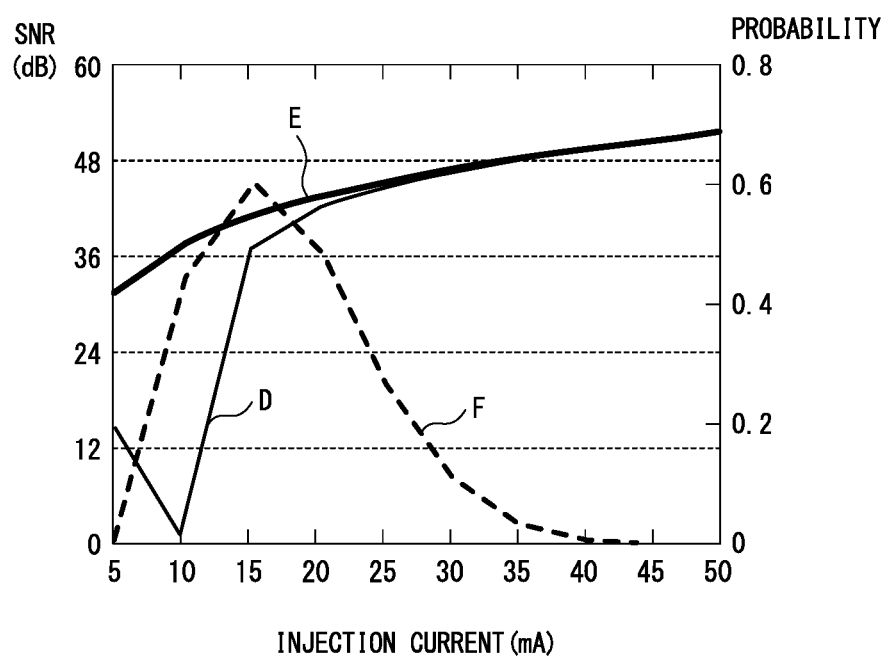
F I G. 1 1

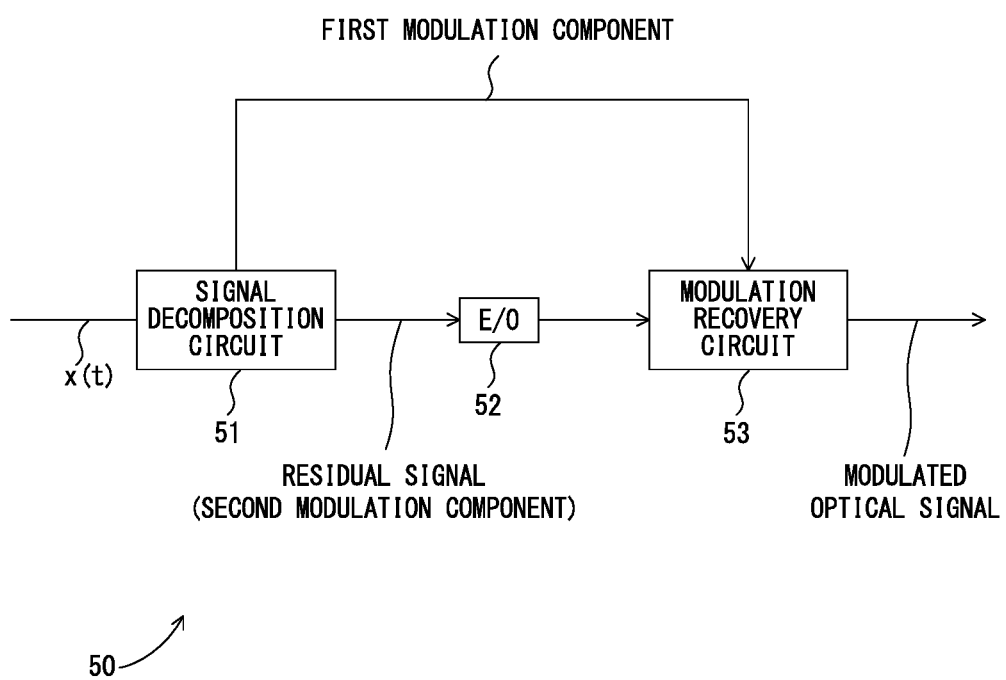
F I G. 1 2

OPTICAL TRANSMITTER AND METHOD FOR TRANSMITTING OPTICAL SIGNAL

CROSS-REFERENCE TO RELATED APPLICATION

This application is a Divisional of U.S. patent application Ser. No. 15/395,501, filed on Dec. 30, 2016, now issued as U.S. Pat. No. 10,320,484 issued on Jun. 11, 2019, which is based upon and claims the benefit of priority of the prior Japanese Patent Application No. 2016-053293, filed on Mar. 17, 2016, the entire contents of which are incorporated herein by reference.

FIELD

The embodiments discussed herein are related to an optical transmitter and to a method for transmitting an optical signal.

BACKGROUND

As one scheme to reduce the cost for configuring a radio communication system, a distributed antenna system (DAS) is implemented. In the distributed antenna system, a signal processing device that processes a transmission signal and a radio device that outputs a radio signal are separated. In the following description, the signal processing device may be referred to as a "digital processing unit". The radio device may be referred to as a "remote radio unit (RRU)" or a "remote radio head (RRH)".

A transmission between a digital processing unit and a remote radio unit is implemented by, for example, Radio over Fiber (RoF). A radio frequency signal (RF signal) or an intermediate frequency signal (IF signal) is transmitted via an optical fiber in Radio over Fiber. The configuration in which an intermediate frequency signal is transmitted via an optical fiber may be referred to as IFoF (Intermediate Frequency over Fiber). IFoF is one aspect of RoF. Note that RoF or IFoF are described in, for example, non-patent documents 1-2 below.

FIG. 1 illustrates an example of a Radio over Fiber system. A digital processing unit DU up-converts a data signal to generate a radio frequency signal (hereinafter, RF signal). In this case, the digital processing unit DU converts the RF signal into an optical signal using an E/O (Electrical-to-Optical) circuit 1 and transmits the optical signal to the remote radio unit RRU via an optical fiber link 2. The remote radio unit RRU converts the received optical signal into an electric RF signal using an O/E (Optical-to-Electrical) circuit 3 and amplifies the electric RF signal. The remote radio unit RRU transmits the amplified RF signal via a radio link.

In the signal transmission described above, a signal-to-noise ratio (SNR) or a spurious free dynamic range (SFDR) is deteriorated due to a relative intensity noise (RIN), a shot noise, a thermal noise and so on. For example, when an SFDR of an input signal $RF_{in}$ in the digital processing unit DU is 70 dB-80 dB, an SFDR of an output signal $RF_{out}$ in the remote radio unit RRU may be deteriorated to 45 dB-50 dB.

Relative intensity noise is dominant in deteriorating in SNR/SFDR among the foregoing factors. Thus, it is requested that relative intensity noise be suppressed in order to improve the SNR/SFDR. Relative intensity noise is a parameter indicating a fluctuation in intensity of laser light (that is, intensity noise) and is calculated by dividing an optical intensity noise in a unit frequency by an average optical power. In addition, relative intensity noise is generated by a vibration of a laser cavity, a variation of laser gain medium, and so on. Note that in the Radio over Fiber system illustrated in FIG. 1, relative intensity noise is generated in the E/O circuit 1.

Relative intensity noise depends on an injection current of a laser. Specifically, when the injection current of a laser is small, relative intensity noise is large. Thus, in the Radio over Fiber system illustrated in FIG. 1, if the injection current of a laser in the E/O circuit 1 is increased, SNR/SFDR of an output signal $RF_{out}$ in the remote radio unit RRU may be improved.

Note that related technologies are described in, for example, patent documents 1-6 and a non-patent document 3.

Patent Document 1: Japanese Laid-open Patent Publication No. 3-156379
Patent Document 2: Japanese Laid-open Patent Publication No. 2001-53688
Patent Document 3: Japanese National Publication of International Patent Application No. 2002-503055 (WO99/40696, U.S. Pat. No. 6,819,877)
Patent Document 4: Japanese Laid-open Patent Publication No. 2003-224522
Patent Document 5: US Patent Publication No. 2005/0002469
Patent Document 6: US Patent Publication No. 2008/0057881
Non-Patent Document 1: Charles H. Cox III et. al. "Limits on the Performance of RF-Over-FiberLinks and Their Impact on Device Design", IEEE Translations on Microwave Theory and Techniques, vol. 54, no 2, pp. 906-920, February 2006.
Non-Patent Document 2: Changyo Han, Seung-Hyun Cho, Hwan Seok Chung, Sang Soo Lee and Jonghyun Lee, "Experimental Comparison of the Multi-IF Carrier Generation Methods in IF-over-Fiber System Using LTE Signals", MWP 2014, Sapporo, Japan.
Non-Patent Document 3: M. Vasic, O. Garcia, J. A. Oliver, P. Alou, D. Diaz, J. A. Cobos, et al. "High Efficiency Power Amplifier Based on Envelope Elimination and Restoration Technique", 2010IEEE As described above, relative intensity noise may be suppressed by increasing the injection current of a laser. The injection current of a laser is proportional to an amplitude of an electric signal to drive the laser (hereinafter, drive signal). That is to say, if an amplitude of a drive signal is increased, a relative intensity noise may be suppressed.

However, an amplitude of a drive signal may greatly change in some modulation schemes of a transmission signal. For example, in a communication system that transmits a signal in OFDM (Orthogonal Frequency Division Multiplexing), M-QAM (M levels Quadrature Amplitude Modulation), W-CDMA (Wideband Code Division Multiple Access) and so on, an amplitude of a drive signal varies greatly and the amplitude of the drive signal may instantaneously become very small. When the amplitude of the drive signal is very small, relative intensity noise is large in an optical transmitter, and SNR/SFDR of a modulated optical signal output from the optical transmitter and an RF signal recovered in an optical receiver is deteriorated.

Note that the problem occurs not only in an optical transmitter used in a Radio over Fiber system but also in an optical transmitter in which an amplitude of an electric signal for driving a laser varies.

SUMMARY

According to an aspect of the present invention, an optical transmitter includes: an amplitude control circuit configured to control an amplitude of an input electric signal to generate a constant amplitude electric signal; an E/O (Electrical-to-Optical) circuit configured to generate a modulated optical signal from the constant amplitude electric signal by a direct modulation; a detector configured to detect an amplitude modulation component of the input electric signal; and an optical power control circuit configured to control a power of the modulated optical signal based on the amplitude modulation component detected by the detector.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an example of a communication system in which an optical transmitter according to embodiments of the invention is used.

FIGS. 7A-7C, 8A and 8B illustrate functions of the optical transmitter according to the first embodiment.

FIG. 11 illustrates an example of an improvement in signal-to-noise ratio.

FIG. 12 illustrates an example of an optical transmitter according to a third embodiment.

DESCRIPTION OF EMBODIMENTS

Figure 1:
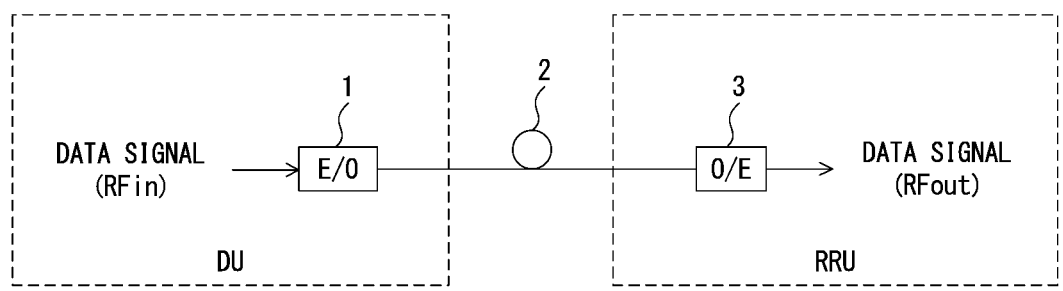
FIG. 1 illustrates an example of a Radio over Fiber system.

FIG. 2 illustrates an example of a communication system in which an optical transmitter according to embodiments of the invention is used. The communication system includes a digital processing unit 100, a remote radio unit 200, and an optical fiber link 300 that is provided between the digital processing unit 100 and the remote radio unit 200. Data is transmitted from the digital processing unit 100 via the optical fiber link 300 to the remote radio unit 200 using Radio over Fiber (RoF).

The digital processing unit 100 includes a plurality of modulators 11-1 through 11-n, a plurality of oscillators 12-1 through 12-n, a combiner 13, and an optical transmitter 14. Data signals CH1 through CHn in a baseband are respectively input to the modulators 11-1 through 11-n. In addition, oscillator signals IF1 through IFn generated by the oscillators 12-1 through 12-n are respectively input to the modulators 11-1 through 11-n. The frequencies of the oscillator signals IF1 through IFn are different from each other. The oscillator signals IF1 through IFn are allocated in the intermediate frequency band in this example. Note that the oscillator signals IF1 through IFn may be radio frequency signals of different frequencies.

The modulators 11-1 through 11-n respectively generate IF signals CH1 through CHn by modulating the oscillator signals IF1 through IFn with the data signals CH1 through CHn. The IF signals CH1 through CHn are modulated signals that respectively transmit the data signals CH1 through CHn. The combiner 13 combines the IF signals CH1 through CHn. The optical transmitter 14 converts the output signal of the combiner 13 into an optical signal. In this example, the optical transmitter 14 generates a modulated optical signal from the output signal of the combiner 13 by a direct modulation. The optical transmitter 14 may be configured to include a laser element. The modulated optical signal output from the optical transmitter 14 is transmitted through the optical fiber link 300 to the remote radio unit 200. That is, the data signals CH1 through CHn are transmitted to the remote radio unit 200 by RoF/IFoF (Radio over Fiber or Intermediate Frequency over Fiber).

The remote radio unit 200 includes an O/E (Optical to Electrical) converter circuit 21, a plurality of demodulators 22-1 through 22-n, a plurality of oscillators 23-1 through 23-n, a plurality of mixers 24-1 through 24-n, a plurality of amplifiers 25-1 through 25-n, and a plurality of antennas 26-1 through 26-n. The remote radio unit 200 receives the modulated optical signal output from the digital processing unit 100 through the optical fiber link 300.

The O/E converter circuit 21 converts the received modulated optical signal into an electric signal. The electric signal includes the IF signals CH1 through CHn. The O/E converter circuit 21 may be configured to include a photo diode. The demodulators 22-1 through 22-n respectively demodulate the IF signals CH1 through CHn included in the output signal of the O/E converter circuit 21 using oscillator signals IF1 through IFn generated by the oscillators 23-1 through 23-n. Note that frequencies of the oscillator signals IF1 through IFn generated by the oscillators 12-1 through 12-n in the digital processing unit 100 are substantially the same as frequencies of the oscillator signals IF1 through IFn generated by the oscillators 23-1 through 23-n in the remote radio unit 200, respectively. Thus, the data signals CH1 through CHn in a baseband are respectively recovered by the demodulators 22-1 through 22-n.

The mixers 24-1 through 24-n respectively up-convert the recovered data signals CH1 through CHn using an oscillator signal LO of a radio frequency to generate RF signals CH1 through CHn. The amplifiers 25-1 through 25-n respectively amplify the RF signals CH1 through CHn. The antennas 26-1 through 26-n respectively output the RF signals CH1 through CHn amplified by the amplifiers 25-1 through 25-n.

First Embodiment

Figure 3:
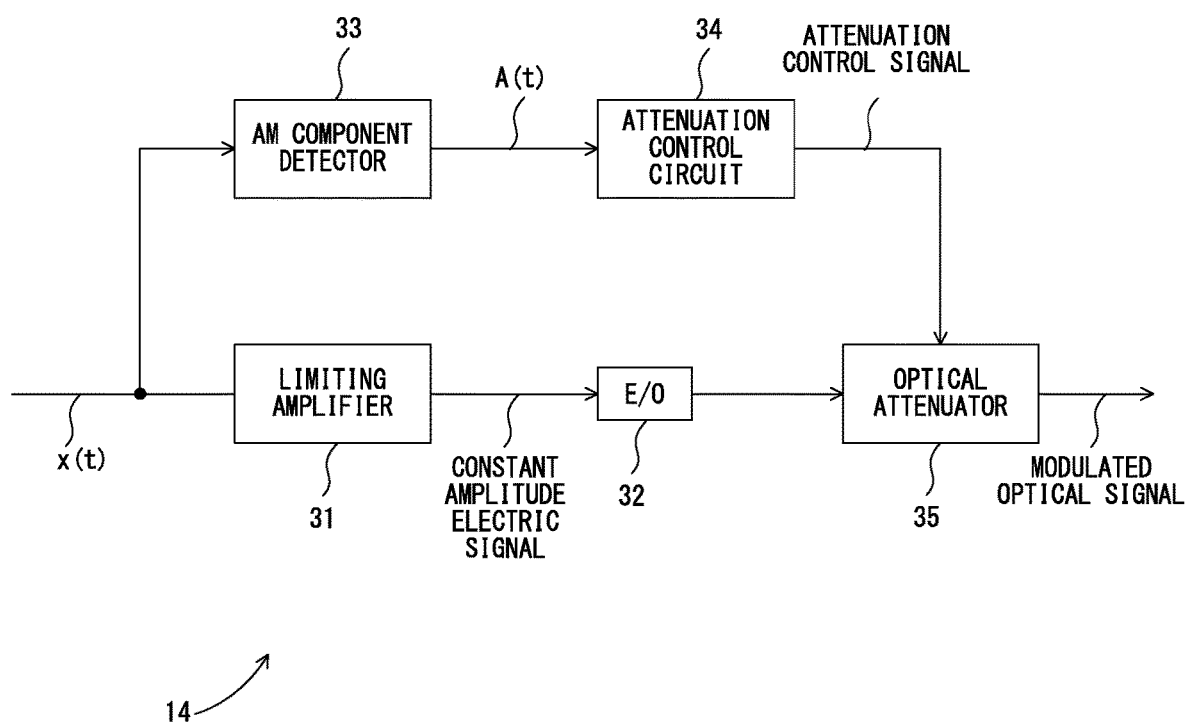
FIG. 3 illustrates an example of an optical transmitter according to a first embodiment.

FIG. 3 illustrates an example of an optical transmitter according to the first embodiment. The optical transmitter 14 according to the first embodiment includes a limiting amplifier 31, an E/O circuit 32, an AM component detector 33, an attenuation control circuit 34, and an optical attenuator 35, as illustrated in FIG. 3. The optical transmitter 14 may be implemented, for example, in the digital processing unit 100 of the Radio over Fiber system illustrated in FIG. 2. However, the optical transmitter 14 may be implemented in a communication system other than the Radio over Fiber system.

An electric signal x(t) generated based on a data signal is input to the optical transmitter 14. For example, if the optical transmitter 14 is implemented in the digital processing unit 100 illustrated in FIG. 2, the drive signal output from the combiner 13 is guided to the optical transmitter 14.

The limiting amplifier 31 controls an amplitude of the input electric signal x(t) to generate a constant amplitude electric signal. That is, the limiting amplifier 31 removes an amplitude modulation component from the input electric signal x(t) to generate the constant amplitude electric signal. An amplitude of the constant amplitude electric signal is specified based on, for example, characteristics of the E/O circuit 32. In one example, the amplitude of the constant amplitude electric signal is specified based on a relative intensity noise that occurs in the E/O circuit 32. Specifically, the amplitude of the constant amplitude electric signal may be specified such that the relative intensity noise that occurs in the E/O circuit 32 is suppressed to be smaller than a desired level.

The E/O circuit 32 converts the constant amplitude electric signal output from the limiting amplifier 31 into an optical signal. Specifically, the E/O circuit 32 generates a modulated optical signal from the constant amplitude electric signal by a direct modulation.

Figure 4:
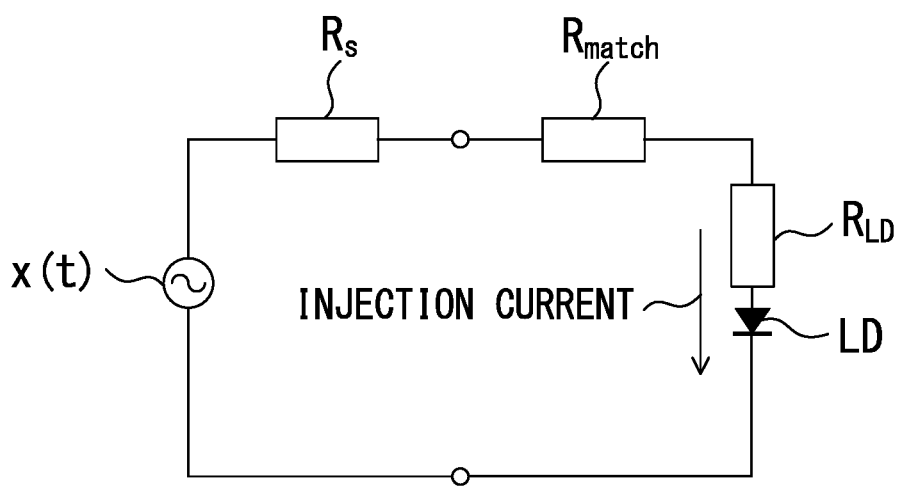
FIG. 4 illustrates an example of an equivalent circuit of an E/O circuit.

FIG. 4 illustrates an example of an equivalent circuit of the E/O circuit 32. In FIG. 4, a circuit for controlling a bias is omitted. The E/O circuit 32 includes a laser diode LD. The electric signal x(t) is applied to the laser diode LD through a resistor $R_s$ and $R_{match}$. $R_{LD}$ represents an inner resistor of the laser diode LD. Thus, the injection current of the laser diode LD is proportional to an amplitude of the electric signal x(t).

Figure 5:
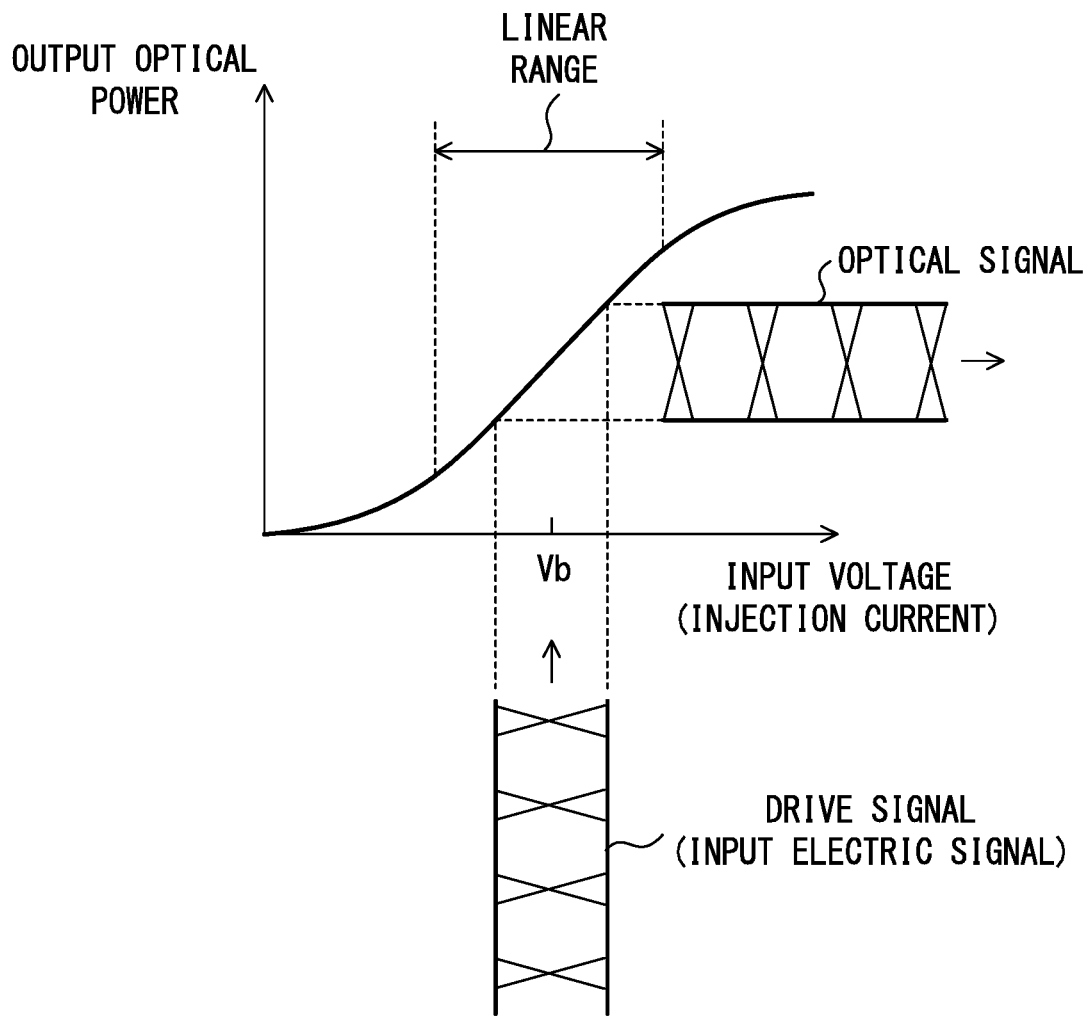
FIG. 5 illustrates an example of characteristics of a laser diode.

FIG. 5 illustrates an example of characteristics of the laser diode LD. The output optical power of the laser diode LD depends on the input voltage. That is, when the input voltage (or injection current) of the laser diode LD increases, the output optical power also increases. In addition, the laser diode LD has a linear range in which the output optical power is proportional to the input voltage. Here, in order to generate an optical signal with a small amount of distortion, it is preferable that the drive signal be controlled within the linear range. In this case, for example, a bias control is performed such that the drive signal is adjusted to be a center of the linear range (Vb in FIG. 5).

Figure 6:
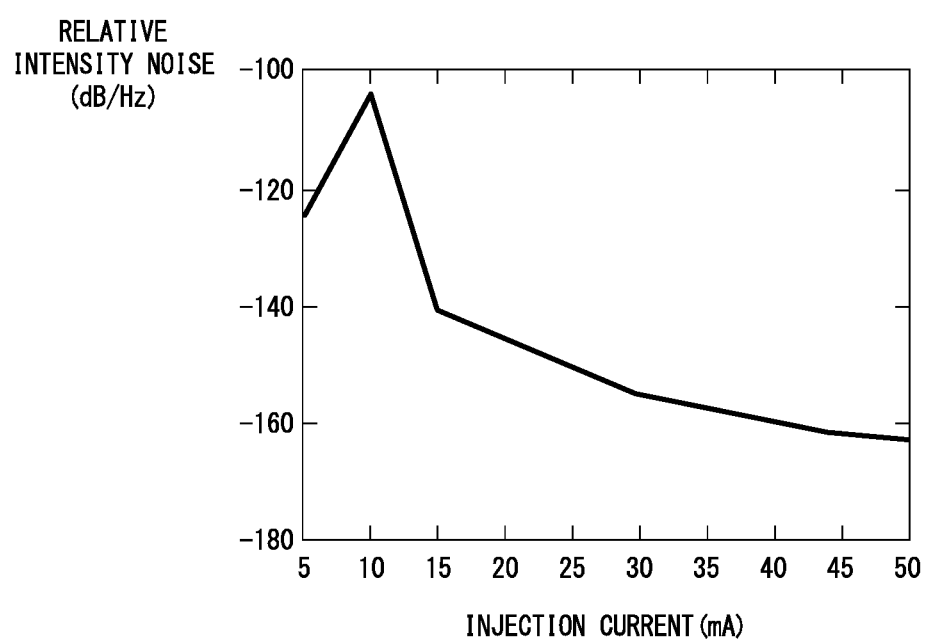
FIG. 6 illustrates an example of relative intensity noise with respect to injection current.

In order to improve an SNR/SFDR of an optical signal, it is requested that relative intensity noise be suppressed. Relative intensity noise depends on the injection current of the laser diode LD as illustrated in FIG. 6. Specifically, when the injection current of the laser diode LD increases, relative intensity noise decreases. Thus, in order to suppress the relative intensity noise, it is preferable to increase the injection current of the laser diode LD. Here, the injection current of the laser diode LD is proportional to an amplitude of the drive signal that is applied to the laser diode LD. Accordingly, in order to suppress the relative intensity noise, it is preferable to increase the amplitude of the drive signal.

However, as described with reference to FIG. 5, in order to suppress a waveform distortion of an optical signal, it is requested that the drive signal be controlled within a linear range of the laser diode LD. That is, it is preferable that the amplitude of the drive signal be smaller than a width of a voltage range in which the output optical power of the laser diode LD is proportional to the input voltage. Therefore, in order to suppress the waveform distortion and suppress the relative intensity noise, it is preferable that the following two conditions be satisfied.
(1) The amplitude of the drive signal is sufficiently large such that the relative intensity noise occurring in the laser diode LD is suppressed to be smaller than a desired level.
(2) The amplitude of the drive signal is smaller than a width of a voltage range in which the output optical power of the laser diode LD is proportional to the input voltage.

Note that the amplitude that is specified as described above may be referred to as "Amax". In addition, the injection current obtained when the amplitude of the drive signal is Amax may be referred to as "Imax". In the example illustrated in FIG. 6, the injection current Imax is 50 mA.

Explanation returns to FIG. 3. The limiting amplifier 31 removes an amplitude modulation component from the input electric signal x(t) to generate the constant amplitude electric signal such that the injection current Imax is given to the laser diode LD. That is, the limiting amplifier 31 generates the constant amplitude electric signal that has the amplitude of Amax. Then the E/O circuit 32 converts the constant amplitude electric signal into an optical signal. Thus, a modulated optical signal in which a relative intensity noise is suppressed is generated.

The AM component detector 33 detects an amplitude modulation component of the input electric signal x(t). The amplitude modulation component of the input electric signal x(t) may be detected by an envelope detection. In this case, the AM component detector 33 detects the amplitude modulation component of the input electric signal x(t) by using a diode device.

Note that the "amplitude modulation component" indicates a variation in amplitude of an electric signal. The "amplitude modulation component" is not limited to an amplitude modulation component directly generated by an electric modulator. For example, in the digital processing unit 100 illustrated in FIG. 2, a drive signal is generated by combining the IF signals CH1 through CHn generated by the modulators 11-1 through 11-n. Here, frequencies of the IF signals CH1 through CHn are different from each other. Thus, even if an amplitude of each of the IF signals CH1 through CHn is constant, the amplitude of the drive signal output from the combiner 13 may vary. In this case, the variation in amplitude of the drive signal is the "amplitude modulation component" detected by the AM component detector 33.

The attenuation control circuit 34 generates an attenuation control signal for controlling an attenuation amount in the optical attenuator 35 based on the amplitude modulation component detected by the AM component detector 33. The attenuation control signal may indicate an attenuation amount in the optical attenuator 35. As an example, the attenuation control signal indicates an attenuation amount in the optical attenuator 35 such that the modulated optical signal output from the optical attenuator 35 has the amplitude modulation component detected by the AM component detector 33. In other words, the attenuation control signal indicates the attenuation amount in the optical attenuator 35 such that a power of the modulated optical signal output from the optical attenuator 35 varies according to the amplitude modulation component detected by the AM component detector 33.

The optical attenuator 35 controls a power of the modulated optical signal output from the E/O circuit 32 according to the attenuation control signal given from the attenuation control circuit 34. Thus, the power of the modulated optical signal output from the optical attenuator 35 varies according to the amplitude modulation component detected by the AM component detector 33. That is, the amplitude modulation component removed from the input electric signal x(t) by the limiting amplifier 31 is recovered in the optical attenuator 35.

The operations of the optical transmitter 14 will be explained. In the following description, the input electric signal x(t) is expressed by the formula below for ease of explanation.

$$x(t)=A(t)\cos(\omega t+\varphi(t))$$

A(t) represents an amplitude modulation component of the input electric signal x(t) and may vary with respect to time. ω represents an angular velocity. φ(t) is a phase modulation component and represents a phase of a symbol corresponding to data. For example, if data is transmitted with BPSK modulation, φ(t) can be zero or π. If data is transmitted with QPSK modulation, φ(t) can be zero, π/2, π or 3π/2.

FIG. 7A illustrates an example of the electric signal x(t) input to the optical transmitter 14. The input electric signal x(t) is expressed by an amplitude modulation component A(t) and a phase component cos(ωt+φ(t)). The amplitude modulation component A(t) varies with respect to time. Note that the phase component is a sine wave, but it is illustrated by a square wave in FIG. 7A, FIG. 7B, FIG. 8A and FIG. 8B to simplify the drawings.

FIG. 7B illustrates a constant amplitude electric signal output from the limiting amplifier 31 when the electric signal x(t) illustrated in FIG. 7A is input to the optical transmitter 14. As described above, the limiting amplifier 31 removes the amplitude modulation component from the input electric signal x(t) to generate the constant amplitude electric signal. The amplitude of the constant amplitude electric signal is Amax. The amplitude Amax is specified in advance based on characteristics of the E/O circuit 32 such that a waveform distortion of a modulated optical signal output from the E/O circuit 32 is suppressed and relative intensity noise is suppressed, as described above.

FIG. 7C illustrates an envelope detected by the AM component detector 33 when the electric signal x(t) illustrated in FIG. 7A is input to the optical transmitter 14. This envelope indicates the amplitude modulation component of the electric signal x(t).

FIG. 8A illustrates a modulated optical signal generated by the E/O circuit 32 when the electric signal x(t) illustrated in FIG. 7A is input to the optical transmitter 14. The E/O circuit 32 converts the constant amplitude electric signal output from the limiting amplifier 31 into an optical signal. That is, the modulated optical signal is generated by driving the laser diode LD with the constant amplitude electric signal illustrated in FIG. 7B. Therefore, an amplitude of the modulated optical signal is constant. However, a power of the modulated optical signal may vary according to the phase modulation component φ(t) of the input electric signal x(t).

A drive signal y(t) (that is, the constant amplitude electric signal output from the limiting amplifier 31) can be expressed by the formula below.

$$y(t)=A\max*\cos(\omega t+\varphi(t))$$

Thus, the injection current I(t) given to the laser diode LD of the E/O circuit 32 can be expressed by the formula below.

$$I(t)=I\max*\cos(\omega t+\varphi(t))$$

Note that Imax represents the injection current of the laser diode LD when the amplitude of the drive signal is Amax.

The E/O circuit 32 generates the modulated optical signal according to the injection current I(t). Here, it is assumed that the drive signal of the E/O circuit 32 is controlled to be within the linear range illustrated in FIG. 5. In this case, an output optical power of the E/O circuit 32 is proportional to the injection current I(t). Thus, the output optical power P(t) of the E/O circuit 32 can be expressed by the formula below.

$$P(t)=P\max*\cos((\omega t+\varphi)(t))+N_{RIN}(t)$$

Note that Pmax represents the output optical power of the E/O circuit 32 when the current Imax is given to the laser diode LD of the E/O circuit 32. $N_{RIN}(t)$ represents a relative intensity noise. Other noise components are omitted.

The relative intensity noise $N_{RIN}(t)$ depends on the injection current of the laser diode LD of the E/O circuit 32, as illustrated in FIG. 6. Here, in the optical transmitter 14 illustrated in FIG. 3, an amplitude of the input electric signal x(t) is controlled to be Amax such that the relative intensity noise $N_{RIN}(t)$ is suppressed. That is, the injection current of the laser diode LD of the E/O circuit 32 is controlled to be Imax, and thus the relative intensity noise $N_{RIN}(t)$ is suppressed.

FIG. 8B illustrates an example of the modulated optical signal output from the optical attenuator 35. A modulated optical signal illustrated in FIG. 8A is input to the optical attenuator 35. In addition, an attenuation amount of the optical attenuator 35 is controlled by an attenuation control signal that is generated by the AM component detector 33 and the attenuation control circuit 34. Here, as described above, the attenuation control signal is generated based on the amplitude modulation component detected by the AM component detector 33. In this example, the attenuation control signal indicates the envelope illustrated in FIG. 7C. Thus, a power of the modulated optical signal output from the optical attenuator 35 varies according to the amplitude modulation component detected by the AM component detector 33. In other words, the modulated optical signal output from the optical attenuator 35 includes the amplitude modulation component detected by the AM component detector 33. That is, the amplitude modulation component A(t) removed by the limiting amplifier 31 is recovered in the optical attenuator 35.

As described above, the optical transmitter 14 generates a modulated optical signal that indicates the amplitude modulation component A(t) and the phase modulation component φ(t) in the input electric signal x(t). Here, the relative intensity noise is suppressed by controlling the injection current of the laser diode LD of the E/O circuit 32. Thus, SNR/SFDR of the modulated optical signal is improved. When the optical transmitter 14 is used in the Radio over Fiber system illustrated in FIG. 2, SNR/SFDR of an electric signal recovered in the remote radio unit 200 (for example, an output signal of the O/E converter circuit 21) is improved.

Figure 9:
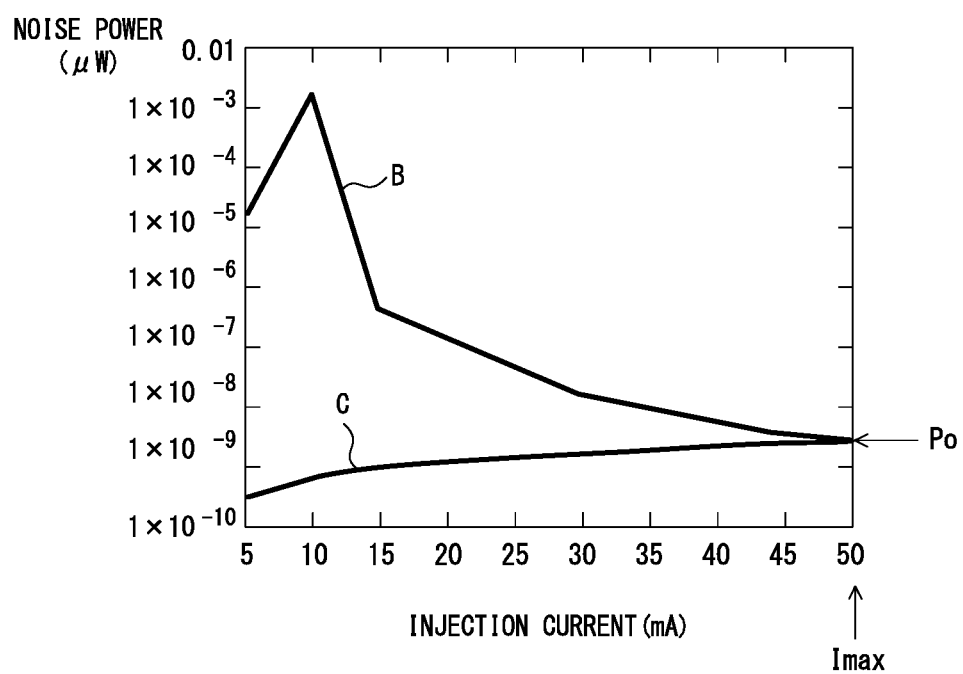
FIG. 9 illustrates a simulation result in suppressing relative intensity noise.

FIG. 9 illustrates a simulation result in suppressing relative intensity noise. A horizontal axis indicates injection current of the laser diode LD of the E/O circuit 32. The injection current is proportional to an amplitude of the input electric signal x(t). The input electric signal is an OFDM signal of 10 MHz in this simulation. A peak-to-average power ratio of the OFDM signal is 8 dB. The average power of the relative intensity noise is calculated based on the characteristics illustrated in FIG. 6.

The curve B represents a power of the relative intensity noise obtained in a configuration in which the input electric signal is given to the E/O circuit 32 without controlling an amplitude of the input electric signal. In this case, when the injection current is small (that is, when an amplitude of the input electric signal is small), the relative intensity noise is large.

The curve C represents a power of the relative intensity noise added to the modulated optical signal generated by the optical transmitter 14 illustrated in FIG. 3. In this case, since the injection current of the laser diode LD is controlled to be Imax (50 mA in FIG. 9), the relative intensity noise added to the modulated optical signal output from the E/O circuit 32 is $P_0$. In addition, the modulated optical signal output from the E/O circuit 32 is attenuated by the optical attenuator 35. Note that the noise component is also attenuated by the optical attenuator 35. Thus, the relative intensity noise added to the modulated optical signal output from the optical attenuator 35 is indicated by the curve C. That is, when an amplitude of the input electric signal is small (that is, when the injection current of the laser diode LD is small), an attenuation amount in the optical attenuator 35 is large, and thus the relative intensity noise is further suppressed. Accordingly, it is expected that the smaller the amplitude of the input electric signal is, the smaller the relative intensity noise is.

Second Embodiment

Figure 10:
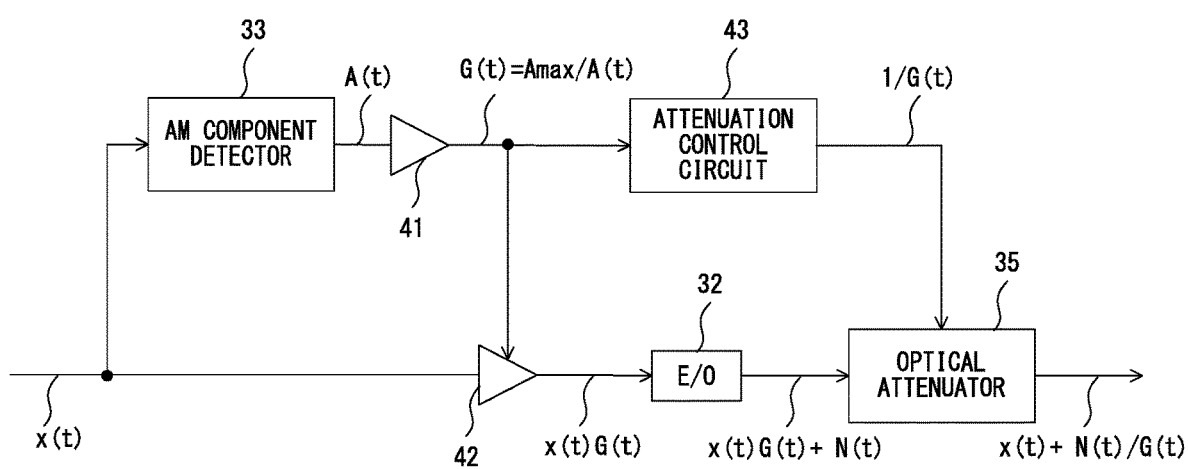
FIG. 10 illustrates an example of an optical transmitter according to a second embodiment.

FIG. 10 illustrates an example of an optical transmitter according to the second embodiment. The optical transmitter according to the second embodiment may also be used in the communication system illustrated in FIG. 2.

In the second embodiment, the optical transmitter 14 includes an E/O circuit 32, an AM component detector 33, an optical attenuator 35, amplifiers 41 and 42, and an attenuation control circuit 43. The E/O circuit 32, the AM component detector 33, and the optical attenuator 35 are substantially the same in the first embodiment and the second embodiment.

The amplifier 41 generates a gain control signal G(t) from the amplitude modulation component A(t) of the input electric signal x(t) detected by the AM component detector 33. The gain control signal G(t) may be represented by "Amax/A(t)". Note that Amax is substantially the same in the first embodiment and the second embodiment.

The amplifier 42 amplifies the input electric signal x(t) according to the gain control signal G(t). That is, the amplifier 42 amplifies the input electric signal x(t) with the gain G(t). As a result, a drive signal x(t)G(t) is generated. Note that the E/O circuit 32 converts the drive signal into an optical signal by a direct modulation. In this conversion, relative intensity noise N(t) occurs in the E/O circuit 32. Thus, the modulated optical signal output from the E/O circuit 32 can be represented by "x(t)G(t)+N(t)".

Here, similarly to the first embodiment, it is assumed that the input electric signal x(t) is expressed by the following formula.

$$x(t)=A(t)\cos(\omega t+\varphi(t))$$

In addition, G(t) is Amax/A(t) in this example. Thus, the drive signal y(t) that is given to the E/O circuit 32 is expressed by the following formula.

$$y(t)=A(t)\cos(\omega t+\varphi(t))*G(t)=A\max*\cos(\omega t+\varphi(t))$$

Accordingly, the drive signal y(t) is substantially the same in the first embodiment and the second embodiment. That is, the amplifier 42 generates the constant amplitude electric signal.

The attenuation control circuit 43 generates an attenuation control signal based on the gain control signal G(t). In this example, the attenuation control signal indicates a reciprocal of the gain control signal G(t). That is, the attenuation control signal can be expressed by "1/G(t)". The optical attenuator 35 attenuates the modulated optical signal output from the E/O circuit 32 according to the attenuation control signal. Thus, the modulated optical signal output from the optical attenuator 35 can be expressed by "x(t)+N(t)/G(t)". Here, it is assumed that Amax is larger than A(t). In this case, G(t) is larger than "1". Accordingly, the relative intensity noise N(t) is suppressed in the modulated optical signal output from the optical attenuator 35.

FIG. 11 illustrates an example of an improvement in signal-to-noise ratio (SNR). The curves D and E respectively represent an SNR of the output signal from the O/E converter circuit 21 in the remote radio unit 200 illustrated in FIG. 2. The curve D represents an SNR obtained in a configuration in which the input electric signal is given to the E/O circuit 32 without controlling an amplitude of the input electric signal. The curve E represents an SNR when the modulated optical signal is generated by the optical transmitter 14 according to the second embodiment. As illustrated in FIG. 11, the SNR is improved according to the second embodiment when the injection current is small. In particular, when the injection current is smaller than 20 mA, the SNR is greatly improved according to the second embodiment. The curve F represents a probability distribution with respect to the injection current of the laser diode LD in the E/O circuit 32.

As describe above, according to the second embodiment, the SNR is improved in the remote radio unit 200. In particular, the SNR is greatly improved when an amplitude of the input electric signal is small.

Third Embodiment

FIG. 12 illustrates an example of an optical transmitter according to the third embodiment. The optical transmitter 50 according to the third embodiment includes a signal decomposition circuit 51, an E/O circuit 52, and a modulation recovery circuit 53, as illustrated in FIG. 12. Note that an electric signal x(t) input to the optical transmitter 50 includes at least two modulation components. For example, the input electric signal x(t) may include at least two of an amplitude modulation component, a phase modulation component, and a frequency modulation component. In the following description, the input electric signal x(t) includes a first modulation component and a second modulation component.

The signal decomposition circuit 51 separates the first modulation component from the input electric signal x(t). That is, the signal decomposition circuit 51 decomposes the input electric signal x(t) into the first modulation component and a residual signal that does not include the first modulation component. The residual signal includes the second modulation component. The first modulation component separated from the input electric signal x(t) is guided to the modulation recovery circuit 53. The residual signal is guided to the E/O circuit 52.

The E/O circuit 52 converts the residual signal into an optical signal. That is, the E/O circuit 52 generates a modulated optical signal from the residual signal by a direct modulation. The residual signal includes the second modulation component. Thus, the modulated optical signal output from the E/O circuit 52 includes the second modulation component.

The modulation recovery circuit 53 modulates the modulated optical signal output from the E/O circuit 52 by using the first modulation component given from the signal decomposition circuit 51. As a result, a modulated optical signal that includes the first modulation component and the second modulation component is generated. That is, the first modulation component is recovered in the modulation recovery circuit 53.

In the optical transmitter 50, in order to suppress the relative intensity noise that occurs in the E/O circuit 32, it is preferable that an amplitude of the residual signal be controlled to be Amax used in the first or second embodiment. That is, it is preferable that the residual signal does not include an amplitude modulation component. For example, when the input electric signal x(t) includes an amplitude modulation component, the first modulation component that is separated from the input electric signal x(t) may be the amplitude modulation component. In this case, the signal decomposition circuit 51 separates the amplitude modulation component from the input electric signal x(t). The residual signal may include a phase modulation component and/or a frequency modulation component.

When the optical transmitter 50 is operated as the optical transmitter 14 according to the first embodiment illustrated in FIG. 3, the signal decomposition circuit 51 may be implemented by the limiting amplifier 31 and the AM component detector 33, the E/O circuit 52 may be implemented by the E/O circuit 32, and the modulation recovery circuit 53 may be implemented by the attenuation control circuit 34 and the optical attenuator 35. In addition, when the optical transmitter 50 is operated as the optical transmitter 14 according to the second embodiment illustrated in FIG. 10, the signal decomposition circuit 51 may be implemented by the AM component detector 33 and the amplifiers 41 and 42, the E/O circuit 52 may be implemented by the E/O circuit 32, and the modulation recovery circuit 53 may be implemented by the attenuation control circuit 43 and the optical attenuator 35.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmitter comprising:
a signal decomposition circuit configured to extract a first modulation component from an input electric signal that includes the first modulation component and a second modulation component and to generate a residual signal that does not include the first modulation component but does include the second modulation component;
an E/O (Electrical-to-Optical) circuit configured to generate a modulated optical signal from the residual signal by a direct modulation; and
a modulation recovery circuit configured to modulate the modulated optical signal output from the E/O circuit based on the first modulation component extracted from the input electric signal.

* * * * *